(12) United States Patent
Lee et al.

(10) Patent No.: US 6,606,278 B2
(45) Date of Patent: Aug. 12, 2003

(54) METHOD FOR MULTIPLE SUPPRESSION BASED ON PHASE ARRAYS

(75) Inventors: Paul J. Lee, Houston, TX (US);
Warren S. Ross, Houston, TX (US);
John V. Young, Humble, TX (US);
Michael M. Zhang, Sugar Land, TX (US); Doug Angevine, Spring, TX (US); Steve E. Heiney, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/992,585

(22) Filed: Nov. 16, 2001

(65) Prior Publication Data

US 2002/0114218 A1 Aug. 22, 2002

Related U.S. Application Data

(60) Provisional application No. 60/257,347, filed on Dec. 20, 2000.

(51) Int. Cl.[7] .............................. G01V 1/38; G01V 1/04; H04R 1/02
(52) U.S. Cl. ............................. 367/24; 367/25; 181/110; 181/112
(58) Field of Search ..................... 367/24, 25; 181/110, 181/112

(56) References Cited

U.S. PATENT DOCUMENTS

| | | | |
|---|---|---|---|
| 2,954,090 A | * 9/1970 | Burg et al. ............... | 367/24 |
| 4,618,024 A | 10/1986 | Domenico ................ | 181/120 |
| 4,632,213 A | * 12/1986 | Domenico ................ | 181/106 |

FOREIGN PATENT DOCUMENTS

| | | | |
|---|---|---|---|
| GB | 1376513 | 12/1974 | ............ G01V/1/38 |

OTHER PUBLICATIONS

Dowlings, S. W.; Geophysics, vol. 47, No. 3, pp 354–375; Abstract only herewith, Mar. 1982.*

Novarini et al; Four. Acoust. Soc. America, vol. 72, # 2, pp 510–514, Aug. 1992.*

* cited by examiner

*Primary Examiner*—Nelson Moskowitz
(74) *Attorney, Agent, or Firm*—Charles R. Schweppe; J. Paul Plummer

(57) ABSTRACT

An apparatus and method for suppressing multiples in the collection of marine seismic data comprises at least one source positioned in the body of water; at least one receiver positioned in the body of water below the air-water interface and near the sources; a bubble diffuser positioned in the body of water so that the bubbles emitted by the bubble diffuser are positioned between the receivers and the air-water interface, wherein the emitted bubbles provide high acoustic reflection and substantially suppress specular reflection of seismic waves; and a control for activating the bubble diffuser during the collection of seismic data by the sources and receivers.

21 Claims, 9 Drawing Sheets

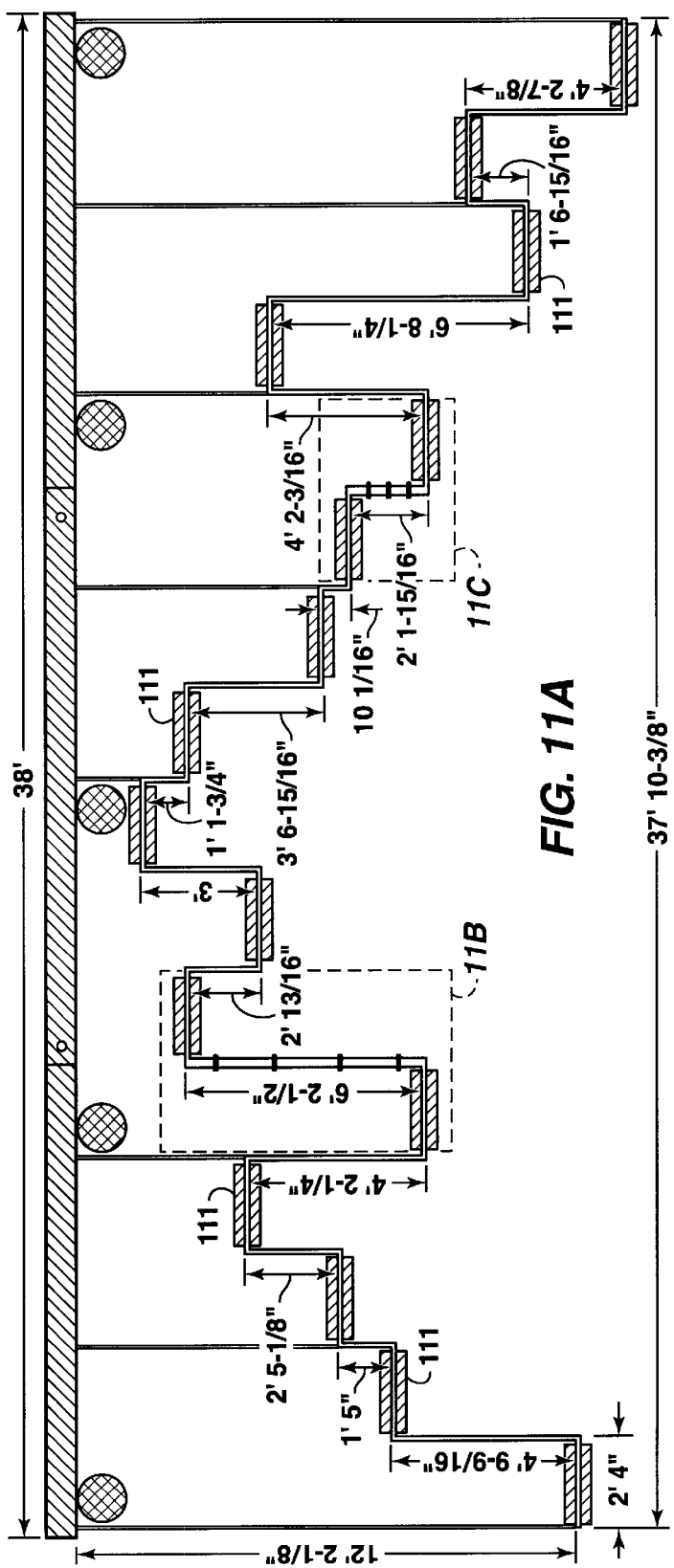
FIG. 11A
FIG. 11B
FIG. 11C

METHOD FOR MULTIPLE SUPPRESSION BASED ON PHASE ARRAYS

This application claims the benefit of U.S. Provisional Application No. 60/257,347 filed Dec. 20, 2000.

FIELD OF THE INVENTION

This invention relates generally to the field of geophysical prospecting. More particularly, the invention is a method of suppressing multiples in the collection of marine seismic data.

BACKGROUND OF THE INVENTION

In marine seismic data, one of the most significant sources of noise is reverberation caused by up-coming seismic waves that have previously reflected off the air-water interface. This type of noise is called 'multiples' and it re-illuminates water-bottom and sub-surface reflectors with time latency. Consequently, multiples generate false images of the sub-surface and hamper accurate interpretation of marine seismic data. The purpose of the present invention is to suppress or reduce multiple energy at the time of data collection.

There exist several data processing methods to eliminate or reduce the multiples in seismic data. Most of these methods are based on filtering multiples out of the data by taking advantage of their unique properties. These properties include predictive repetition with a constant amplitude decay rate and move-out difference from the primary signal. Other more advanced data processing methods involve modeling the multiples and solving the full wave equation.

Another class of methods to reduce multiples in intermediate depths of water uses a configuration of marine seismic data acquisition called 'ocean bottom cable' (OBC). This type of acquisition positions different sensors, typically hydrophones and geophones, in a cable at the water bottom to measure both pressure and particle velocity waves, respectively. Combined with a proper processing algorithm, these methods can subtract a portion of multiple energy from the collected seismic data.

Multiple contamination is a fundamental impediment to use of detailed analysis of seismic amplitude data in many prospect areas. Complex multiples severely corrupt target horizons rendering structural and basic stratigraphic mapping difficult and seismic amplitudes of little value. Aggressive application of current mitigation methods has failed to substantively improve data quality, especially when the multiples are more than an order of magnitude stronger than the primary signals of interest.

W. H. Clark's U.S. Pat. No. 4,625,302, "Acoustic Lens for Marine Seismic Data Multiple Reflection Noise Reduction", issued Nov. 25, 1986, discloses a method for multiple reduction in marine seismic data acquisition using air bubbles. Clark's '302 patent relies on a refraction mechanism achieved by lowering local sound speed relative to nominal water sound speed. This is accomplished by a bubble emitter configured to produce an acoustic lens of air bubbles. The air bubble lens is designed to refract, rather than reflect, the multiples laterally and thus away from the receivers.

P. D'Antonio et al. in U.S. Pat. No. 5,401,921 "Two-Dimensional Primitive Root Diffusor", issued Mar. 28, 1995 to RPG Diffusor Systems, Inc., discloses a two-dimensional acoustic diffuser based on a primitive root sequence. This diffuser is constructed with solid materials, not air-bubbles. It has a relatively small scale (2 ft by 2 ft for one period of two-dimensional primitive root sequence) because it is designed for diffusing sound wavelengths in air. In addition to the phase grating, it also relies on sound absorption by the back plane. The main application is for suppressing sound in confined air spaces such as music halls and recording studios.

W. H. Berhens' U.S. Pat. No. 5,959,938, "Tuned Bubble Attenuator for Towed Seismic Array", issued Sep. 28, 1999, discloses a method to attenuate horizontally transmitted acoustic energy in a marine environment by emitted bubbles. Berhens' '938 patent uses the attenuation mode, rather than the reflection mode, by attempting to create relatively large (>9 mm) bubbles at the resonant frequency of the seismic wave. The emitted bubbles are localized near the seismic source and their purpose is to restrict side-directional propagation to enhance signal-to-noise ratio, rather than to attenuate multiples.

SUMMARY OF THE INVENTION

The present invention is an apparatus for suppressing multiples in the collection of marine seismic data. The apparatus comprises at least one source positioned in the body of water; at least one receiver positioned in the body of water below the air-water interface and near the sources; a bubble diffuser positioned in the body of water so that the bubbles emitted by the bubble diffuser are positioned between the receivers and the air-water interface, wherein the emitted bubbles provide high acoustic reflection and substantially suppress specular reflection of seismic waves; and a control for activating the bubble diffuser during the collection of seismic data by the sources and receivers.

The present invention is also a method for suppressing multiples in the collection of marine seismic data. At least one source and at least one receiver are positioned in a body of water, with the receivers positioned below the air-water interface. A bubble diffuser is positioned in the body of water so that the bubbles emitted by the bubble diffuser are positioned between the receivers and the air-water interface. The emitted bubbles provide high acoustic reflection and substantially suppress specular reflection of seismic waves. The bubble diffuser is activated during the collection of seismic data by the sources and receivers.

BRIEF DESCRIPTION OF THE DRAWINGS

The present invention and its advantages may be more easily understood by reference to the following detailed description and the attached drawings in which:

FIG. 11 shows a primitive root embodiment of the multiple suppresser used in the small-scale field experiment example;

While the invention will be described in connection with its preferred embodiments, it will be understood that the invention is not limited thereto. On the contrary, it is intended to cover all alternatives, modifications and equivalents that may be included within the spirit and scope of the invention, as defined by the appended claims.

DETAILED DESCRIPTION OF THE INVENTION

The present invention is an apparatus and method for suppressing multiples in the collection of marine seismic data. Unlike the previously mentioned data processing methods, the present invention directly attacks the generation of multiples at the air-water interface. The present invention does this by creating phase changes in the down-going waveform at the air-water interface. The physical concept of a phase array is known in the fields of antenna theory, radar, and sonar. By illuminating an appropriately designed phase array, patterns of electromagnetic or acoustical fields can be manipulated. For example, phase arrays have been used to enhance forward-to-backward gain or angular sensitivity. Depending on the choice of phase grating, it is possible to reduce the specular reflection of the wave field and divert wave energy to directions of no interest. This type of phase grating is beneficial to suppress the multiple, which is generated by the specular reflection of up-going seismic waves at the air-water interface.

The multiple-suppressing phase array of the present invention is physically implemented by creating surfaces of high acoustic reflection with depth variation near the air-water interface. Considering the range of wavelengths of interest for marine seismic data acquisition, it is not practical to use a solid structure with the required acoustical properties (e.g. near 100% reflection) to build a phase array. However, it is possible to reflect seismic waves to a desirable direction by injecting air bubbles into water. The present invention uses air bubbles (or a mixture of air and water) to achieve the necessary acoustic properties for the reflection of the seismic wave. This is discussed in Domenico, S. N., "Acoustic wave propagation in air-bubble curtain in water—part I: History and theory", Geophysics, v.47, pp.345–353, 1982. A small amount of air in the water decreases sound wave speed so much that the seismic wave is reflected from the boundary of air-mixed water. The present invention can be applied to various configurations of marine seismic data acquisition including, but not limited to, towed single/multi streamer and 2 or 4 component ocean bottom cables/sensors (2/4C OBC/OBS).

Figure 1A:
FIGS. 1a and 1b show top and side views, respectively, of an embodiment of the apparatus of the present invention for suppressing multiples in the collection of marine seismic data.
Figure 1B:
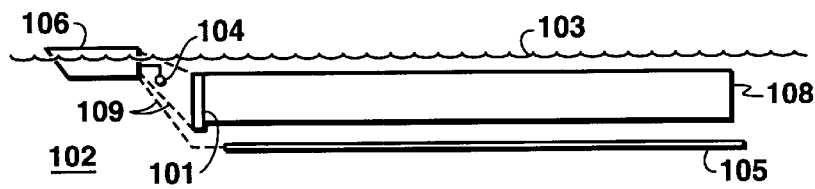

FIGS. 1a and 1b show top and side views, respectively, of an embodiment of the apparatus of the present invention for suppressing multiples in the collection of marine seismic data using a specially configured bubble diffuser 101. Specific embodiments for special configurations of the bubble diffuser will be described in detail in conjunction with the discussion of FIGS. 2c and 2d, below. The bubble diffuser 101 is positioned in a body of water 102 with an air-water interface 103. At least one seismic source 104 is positioned in the body of water 102 at or below the air-water interface 103, as is typical in the industry, and in the general vicinity of the bubble diffuser 101. The seismic sources 104 are preferably airguns or marine vibrators, positioned singly or in arrays, but may be any other appropriate marine seismic source known in the art. The seismic sources 104 will be used in conjunction with the bubble diffuser 101 in the collection of marine seismic data.

At least one seismic receiver 105 is positioned in the body of water 102 below the air-water interface 103 and in the general vicinity of the sources 104, as is typical in the industry. The seismic receivers 105 are preferably pressure sensors such as hydrophones, but may be any other appropriate sensors adapted for the marine environment. The seismic receivers 105 will be used in conjunction with the sources 104 and the bubble diffuser 101 in the collection of marine seismic data.

In a preferred embodiment, both the sources 104 and receivers 105 are towed through the body of water 102 by a towing vessel 106. This towing vessel 106 is preferably a seismic vessel equipped for this task. The sources 104 and receivers 105 may be towed by the same or different towing vessels 106. The sources 104 may be towed in single or multiple arrays and the receivers 105 may be towed in single or multiple seismic streamers. In an alternative embodiment, the receivers 105 may be positioned on the bottom of the body of water 102 in an ocean bottom cable. Here the receivers 105 are preferably pressure and particle velocity sensors such as hydrophones and geophones, respectively, but may be any other appropriate sensors, such as accelerometers, adopted for the marine environment.

The bubble diffuser 101 is positioned in the body of water 102 at or below the air-water interface 103 and in the general vicinity of the sources 104 and the receivers 105. The bubble diffuser 101 may be attached to a support 107 in some embodiments. The bubble diffuser 101 emits bubbles 108 into the body of water 102. The bubble diffuser 101 is positioned so that the emitted bubbles 108 are positioned between the receivers 105 and the air-water interface 103.

Figure 2A:
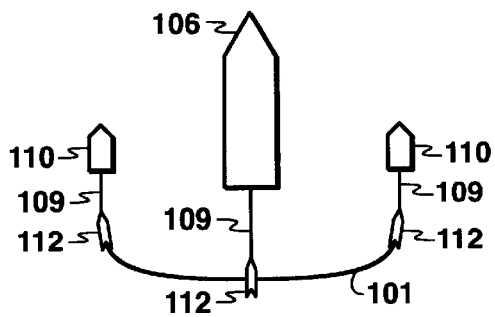
FIGS. 2a through 2d show top and stern views of two embodiments of the apparatus of the present invention.
Figure 2B:
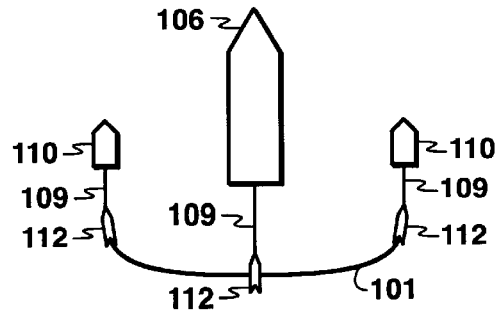

FIGS. 2a through 2d show top and stern views of two embodiments of the apparatus of the present invention. A towing line 109 is attached to the bubble diffuser 101 or the support 107 for the bubble diffuser 101 and then to a vessel for towing. The towing line 109 may be attached to and towed by the same towing vessels 106 towing the sources 104 or receivers 105. Alternatively, the towing line 109 may be attached to and towed by auxiliary work vessels 110, such as one or more tugs, as shown in FIGS. 2a and 2b. The auxiliary work vessels 110 assist the towing vessels 106 to deploy, tow, and recover the bubble diffuser 101. Alternative embodiments are also possible. For example, the bubble diffuser 101 may be towed in front of the towing vessels 106, rather than between the seismic sources 104 and receivers 105.

A compressed air hose (not shown) for supplying compressed air to the bubble diffuser 101 is attached to the bubble diffuser 101 and to a source of compressed air (not shown). The source of compressed air may be located on the towing vessel 106 or auxiliary work vessel 110 towing the bubble diffuser 101, but may also be located on a separate vessel (not shown). The compressed air hose is preferably designed to supply sufficient pressure so that the emitted bubbles 108 are of a sufficiently high volume concentration in the water to act as a high acoustic reflector of seismic waves. The bubble diffuser 101 is also preferably designed so that the emitted bubbles 108 are of sufficiently small size that the bubbles 108 rise slowly in the body of water 102.

There are many ways to mix air into water to generate bubbles. For one example, pressurized air can be fed to a porous ceramic stone to generate fine air bubbles in the water. Another example is using a water pump as an impeller to grind air into water to create an air-water mixture that is sent to a porous hose to generate bubbles. The present invention is not limited to these two methods. It covers any methods of manipulating the local acoustical properties to construct a phase array. This would include, but is not limited to, air or gas, mixed or dissolved, in water or fluid, by mechanical, electrical, or chemical methods. A control (not shown) for activating the bubble diffuser 101 is attached to the source of compressed air. The control is used to activate the bubble diffuser 101 during the collection of seismic data using the sources 104 and receivers 105.

As mentioned above, the bubble diffuser 101 is specially configured. Preferably, the bubble diffuser 101 comprises a plurality of diffuser elements 111. Embodiments of the diffuser elements 111 include, but are not limited to, ceramic stone air diffusers and porous hose air diffusers. The diffuser elements 111 are preferably positioned in a vertically oriented phase grating. The diffuser elements 111 are preferably positioned in the phase grating so that the emitted bubbles 108 substantially suppress specular reflection of up-going seismic waves from the sources 104. The phase grating is preferably focussed on a range of distances to the sources 104 and receivers 105.

Figure 2C:
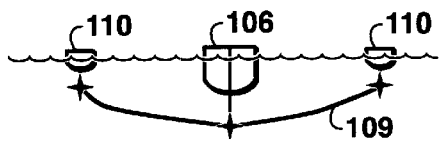
Figure 2D:
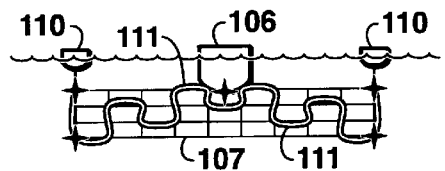

The theoretical concept behind a first embodiment of the phase grating in the present invention is mathematically based on the concept of integer sequences from number theory. The mathematical basis for this is discussed in more detail below. These integer sequences can be used to construct the phase grating of diffuser elements 111 that will be used to interfere with multiples. Theoretically, the resulting phase grating diffuses the up-going seismic wave such that the multiples in the down-going specular direction are greatly reduced. For use in the present invention, the applicable types of integer sequences include, but are not limited to, quadratic residue, primitive polynomial, primitive root, complex Legendre, and Zech logarithm. In this first embodiment, the diffuser elements 111 of the phase grating are positioned according to a discrete number sequence. An example of this phase grating configuration is shown in FIG. 2d. The preferred discrete number sequence is a primitive root sequence. The present invention also includes any type of phase grating other than those based on integer sequences or any other aspect of number theory.

For instance, in another embodiment, the diffuser elements 111 of the phase grating are positioned in a vertically oriented, generally concave upward shape. An example of this configuration is shown in FIG. 2c. The preferred concave upward shape is a wedge shape, pointed upward. This wedge shape may be thought of as a continuous version of the discrete number sequence phase array described above.

For the wedge-shaped embodiment of the bubble diffuser 101, the cross-section shape is maintained by the tension between the towing or auxiliary work vessels 106, 110 and buoys/stabilizers 112. A stabilizer or clump weight (not shown) may be required at the base of the wedge to maintain the correct shape. For the primitive root embodiment of the bubble diffuser 101, a net, as shown in FIG. 2d, may be used as a support 107 to maintain the proper depths of the diffuser elements 111. The net is towed by towing lines 109 attached to towing or auxiliary work vessels 106, 110 and buoys/stabilizers 112. Alternatively, for either embodiment of the bubble diffuser 101, the diffuser hose assembly may be attached directly to the towing or auxiliary work vessels 106, 110, rather than to the buoys/stabilizers 112. Since the bubble diffuser 101 is made of flexible components, such as cables, hoses, and net, the components can be stored on drums and easily deployed and recovered by the towing or auxiliary work vessels 106, 110.

Figure 3A:
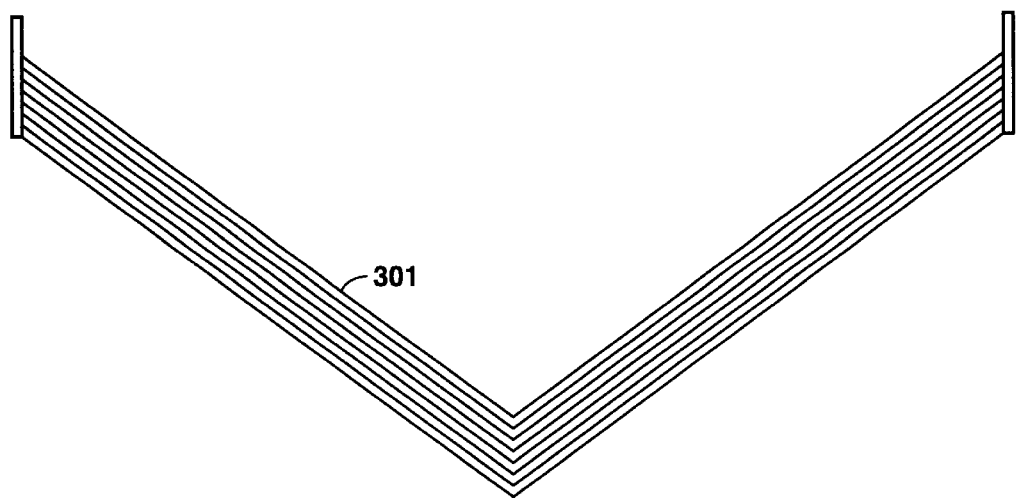
FIG. 3a shows an embodiment of the wedge shaped bubble diffuser with eight bundles of porous air hoses stacked vertically.
Figure 3B:
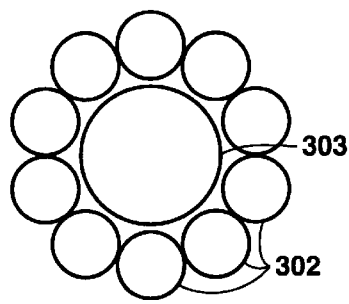
FIG. 3b shows an embodiment of the wedge shaped bubble diffuser with ten air hoses wrapped around a supporting steel cable.
Figure 3C:
FIG. 3c shows an embodiment of the wedge shaped bubble diffuser with 300 trailing air lines.

In order to achieve high acoustic reflection in the seismic frequency band with air, it is necessary to generate a layer of bubbles 108 (or air-water mixture) several meters thick. A single line of diffuser elements 111 (ceramic stone, porous hose, or other) may not have a high enough airflow rate to achieve this. It is possible to increase the airflow rate by stacking multiple diffuser elements 111. FIG. 3a shows another embodiment of the wedge shaped bubble diffuser 101 with a plurality of bundles of porous hoses 301 stacked vertically. Although eight bundles of porous hoses 301 are shown in FIG. 3a, the present invention is not limited to that particular number. To achieve a higher flow rate, a plurality of porous hoses 302 are wrapped around a supporting steel cable 303 in the circumferential direction as shown in FIG. 3b. Although ten porous hoses 302 are shown in FIG. 3b, the present invention is not limited to that particular number. By a combination of concepts of the embodiments shown in FIGS. 3a and 3b, it is possible to increase the flow rate by factor of 8×10=80. Another embodiment designed to increase the airflow rate is shown in FIG. 3c. In this embodiment, there are a plurality of trailing air lines 304 attached to a wedge shaped bubble diffuser 101. Although 300 trailing air lines 304 are proposed for the embodiment shown in FIG. 3c, the present invention is not limited to that particular number. Each trailing air line 304 emits bubbles 108 (as shown in FIG. 1). With horizontal extension in the inline dimension, the trailing air lines 304 can together feed more air than a single air line bubble diffuser 101. Since the trailing air lines 304 are streamlined, this embodiment has less drag than the embodiment of FIG. 3a. The maximum flow rate of this embodiment is easily adjusted by increasing the total length of the trailing air lines 304. As a variation of the trailing air lines, a continuous diffusing surface can be created by putting the trailing air lines adjacent to each other. Of course, all three of the concepts involved in FIGS. 3a–3c can be combined to potentially increase the airflow rate by many orders of magnitude if necessary.

Figure 4:
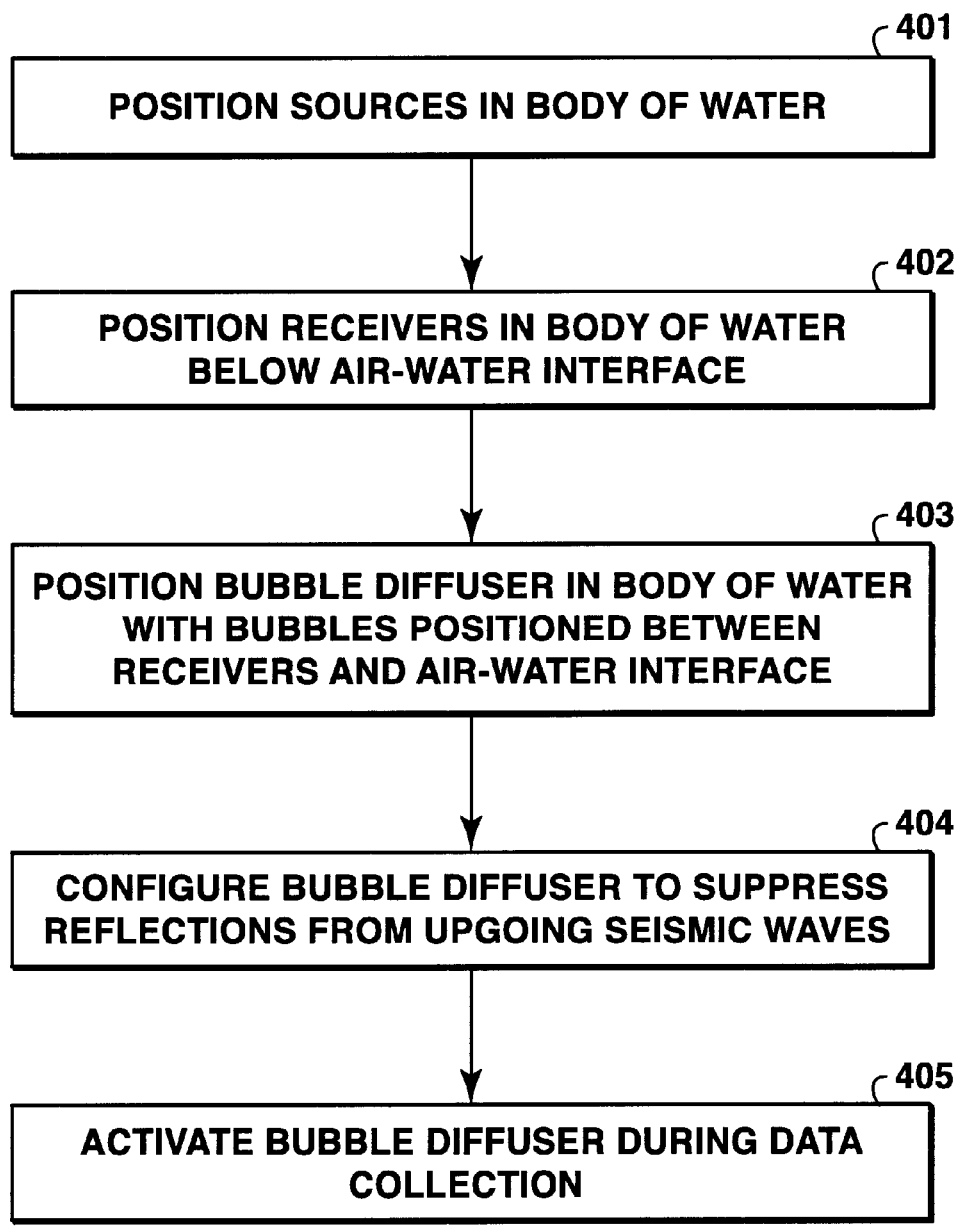
FIG. 4 is a flow chart illustrating the steps of the method for one embodiment of the present invention for suppressing multiples in the collection of marine seismic data.

FIG. 4 is a flow chart illustrating the steps of the method for one embodiment of the present invention for suppressing multiples in the collection of marine seismic data, using a specially configured bubble diffuser. The collection of marine seismic data takes place in a body of water with an air-water interface. First, in step 401, at least one seismic source is positioned in the body of water, as is typical in the industry. The seismic sources are preferably airguns or marine vibrators, positioned singly or in arrays, but may be any other appropriate marine seismic source known in the art.

In step 402, at least one seismic receiver is positioned in the body of water, in the general vicinity of the seismic sources, as is typical in the industry. The seismic receivers are positioned below the air-water interface. The receivers are preferably pressure sensors such as hydrophones, but may be any other appropriate sensors adapted for the marine environment.

In a preferred embodiment, both the seismic sources and seismic receivers from steps 401 and 402, respectively, are towed through the body of water by seismic vessels equipped for this task, as is well known in the art. The sources and receivers may be towed by the same or different vessels. The sources may be towed in single or multiple arrays and the receivers may be towed in single or multiple seismic streamers. In an alternative embodiment, the receivers may be positioned on the bottom of the body of water in an ocean bottom cable. Here the receivers are preferably pressure and particle velocity sensors such as hydrophones and geophones, respectively, but may be any other appropriate sensors adopted for the marine environment.

In step 403, a bubble diffuser is positioned in the body of water. The bubble diffuser is positioned so that the bubbles emitted from the bubble diffuser are positioned between the receivers and the air-water interface. The bubble diffuser is preferably towed through the body of water between the receivers and the air-water interface to properly position the emitted bubbles. The bubble diffuser may be towed by the same towing vessels towing the sources or receivers. Alternatively, the bubble diffuser may be towed by auxiliary work vessels, such as one or more tugs.

In step 404, the bubble diffuser from step 403 is configured so that the emitted bubbles substantially suppress specular reflection of up-going seismic waves from the seismic sources. The details of this special configuration are described in conjunction with the discussion of FIGS. 2c and 2d above. In addition, the emitted bubbles are preferably of a sufficiently high volume concentration in the water to act as a high acoustic reflector of seismic waves. The emitted bubbles are also preferably of sufficiently small size that the bubbles rise slowly in the water, thus retaining their effective position for a longer time.

In step 405, the bubble diffuser from step 403 is activated during the collection of marine seismic data by the sources and receivers. Thus seismic waves originating from the seismic source and traveling upward after possible reflection from reflectors below will be substantially deflected to the side rather than reflected down from the air water interface toward the receivers. This will reduce the amount of noise caused by multiples as recorded by the receivers during the collection of marine seismic data.

Mathematical Foundation

The present invention depends upon the reflective properties of a phase array based upon an integer sequence from number theory. Among the possible phase gratings based on integer sequences, the primitive root sequence is known to minimize the main lobe and have evenly distributed side lobes. This is discussed in Schroeder, M. R., "Phase gratings with suppressed specular reflection", Acoustica, v.81, pp.364–369, 1995. Thus, the primitive root sequence is chosen to demonstrate how a phase array can reduce the multiples.

In number theory, one can find a primitive root for any given prime number. The primitive root, g, for a prime number, p, is defined to be the smallest prime number g that generates a complete set of integers between 1 and p−1 by remainders by the prime number p on the positive integer powers of g. Equation (1) shows the generation of a primitive root sequence.

$$\{mod(g^j,p), j=1,2, \ldots p-1\}=\{mod(g^1,p), mod(g^2,p), \ldots ,mod(g^{p-1},p)\} \quad (1)$$

Here, mod(a,b) means the smallest positive remainder after integer multiples of b are subtracted from a. Thus, mod (6, 8)=6−(0·8)=6 and mod (11, 8)=11−(1·8)=3. For example, prime number p=1 has the primitive root g=2 and together they generate the following sequence:

$$\{mod(2^1,11), mod(2^2,11), \ldots ,mod(2^{10},11)\}=\{2,4,8,5,10,9,7,3,6,1\} \quad (2)$$

Using the primitive root sequence, a phase grating is constructed, with phases at different positions along the grating given by:

$$\phi_j = \frac{2\pi \mathrm{mod}(g^j, p)}{p}, \text{ where } j=1, 2, \ldots, p-1. \quad (3)$$

With the above phase grating, an expression of the linear array response $A_k$ in the far field, is obtained:

$$A_k = \sum_{n=0}^{p-2} \exp(i\phi_{n+1})\exp(-2\pi i n w \sin\alpha_k / \lambda), \quad (4)$$

where $i=\sqrt{-1}$, $\lambda$ is the acoustic wavelength in the medium, $\alpha_k$ is the incident polar angle (i.e. $\alpha_k=0$ corresponds to the normal or broadside direction), and w is the spacing between adjacent elements. By substituting the nondimensional spatial wavenumber k, defined as $$\frac{w(p-1)}{\lambda} \sin\alpha_k,$$

for the sine of the incident polar angle, Equation (4) becomes:

$$A_k = \sum_{n=0}^{p-2} \exp(i\phi_{n+1})\exp[-2\pi i n k/(p-1)]. \quad (5)$$

The above expression is the discrete Fourier transform (DFT) of the phase grating contribution $\exp(i\phi_j)$.

The magnitude of $A_k$ is known when the nondimensional spatial wavenumber k is an integer:

$$|A_k| = \begin{cases} 1 & \text{for } k=0 \\ \sqrt{p} & \text{for other integer values of } k. \end{cases} \quad (6)$$

This expression simply states that the specular reflection (k=0) is smaller than the side lobes (k≠0) by a factor of $\sqrt{p}$. Also, compared to the case of zero phase grating (i.e. perfectly reflecting surface with $\phi_j=0$), the specular reflection is reduced by a factor of p. Thus, when a large prime number is chosen for a primitive root phase array, one can greatly reduce the specular reflection and divert energy to the side directions.

Even though the primitive root sequence is shown as an example, other types of integer sequences or even real number sequences can be used in the present invention for multiple suppression.

One way to create a phase grating for seismic (acoustic) waves is to vary the elevation of a reflecting surface. If the reference elevation of the reflecting surface (i.e. air-water interface) is set to be zero degree phase and the two-way path length between source and receiver is considered, the surface elevation $z_j$ is related to the phase grating as:

$$z_j = \frac{\lambda}{2}\left(1 - \frac{\phi_j}{2\pi}\right). \tag{7}$$

In Equation (7), $\lambda$ equals the wavelength for the lowest frequency in the signal band because the array cannot cover full angles below that frequency.

Figure 5:
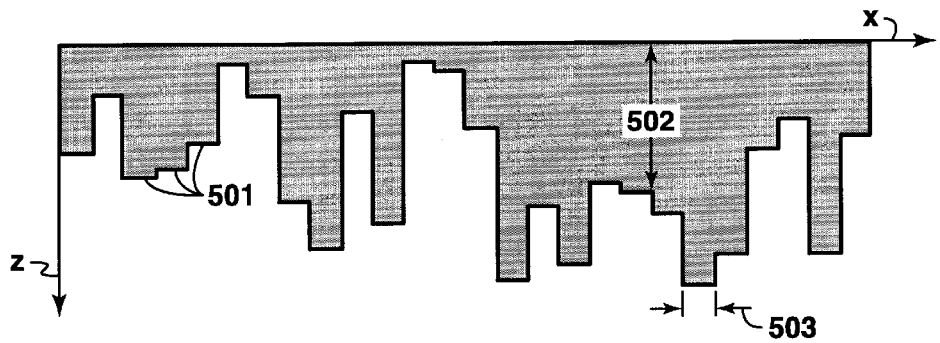
FIG. 5 illustrates an example of a vertically oriented phase grating constructed in accordance with the present invention.

FIG. 5 illustrates an example of a vertically oriented phase grating constructed in accordance with the present invention. Since the phase grating is discrete, the surface elevation is also discrete. Thus, the surface consists of flat reflecting surfaces 501 with discrete elevation changes 502 and uniform spacing 503. The width (spacing) 503 of an individual surface can be found from the assumption behind Equation (4). In order for Equation (4) to be valid, the spacing w is:

$$w \le \begin{cases} \lambda/2 & \text{for broadside incidence} \\ \lambda/4 & \text{for grazing incidence} \end{cases} \tag{8}$$

In Equation (8), $\lambda$ is the wavelength for the highest frequency in the signal band because it is required to use a more rigorous formulation than the array response, Equation (5), above that frequency.

Equation (4) was derived assuming the distance from the array to a field point is much greater than the array dimensions. Thus, the phase grating is focused at infinite range and it may not perform well at finite ranges. In order to focus the phase grating at a finite range, the exact phase at a finite range should match the approximated phase at infinite range. For the case of normal incidence, the corrected surface elevation z' is obtained:

$$z' = \left(z - \frac{R_s + R_r}{2}\right)\sqrt{1 - \frac{r^2}{(R_s - z)(R_r - z)}} + \frac{R_s + R_r}{2}, \tag{9}$$

where r is horizontal coordinate at the array surface, $R_s$ is source range, and $R_r$ is receiver range. If z and r are small compared to the ranges, Equation (9) can be approximated as:

$$z' \approx z + \frac{r^2}{2}\frac{R_s + R_r}{2R_s R_r}. \tag{10}$$

The above focusing technique is independent of phase grating type.

In order to interfere with the multiple at the air-water interface, the size of a phase array must be large enough to interact with the Fresnel zone of the up-going seismic wave. The diameter of the Fresnel zone (FZ) is:

$$FZ = \sqrt{2\pi R_s} \tag{11}$$

For a given sequence of phases for a phase grating, the number of periods of the sequence can be simply increased until the phase array covers the entire Fresnel zone.

EXAMPLES

Table 1 gives the input specification for an example of an embodiment of the present invention. This example is a design concept for a phase array multiple suppresser for a high-resolution seismic scale. The phase array is designed to suppress water-bottom generated multiples, including source and possibly receiver-side pegleg multiples. The receivers are configured as a streamer deployed below the multiple suppresser.

TABLE 1

| | |
|---|---|
| Sound speed (c, m/s) | 1500 |
| Lower frequency ($f_1$, Hz) | 200 |
| Upper frequency ($f_2$, Hz) | 700 |
| Water bottom depth (d, m) | 100 |
| Source wavelet | Ricker pulse with peak frequency at $f_{peak}$ = 350 Hz |

Figure 6A:
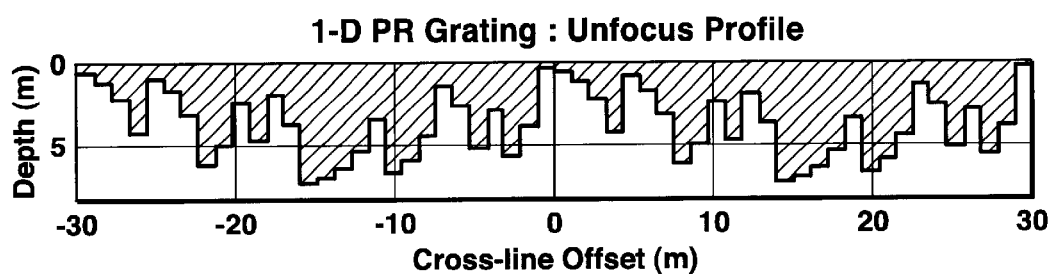
FIGS. 6a and 6b show profiles of a phase array computed for a primitive root sequence without and with, respectively, the focusing technique of the present invention.
Figure 6B:
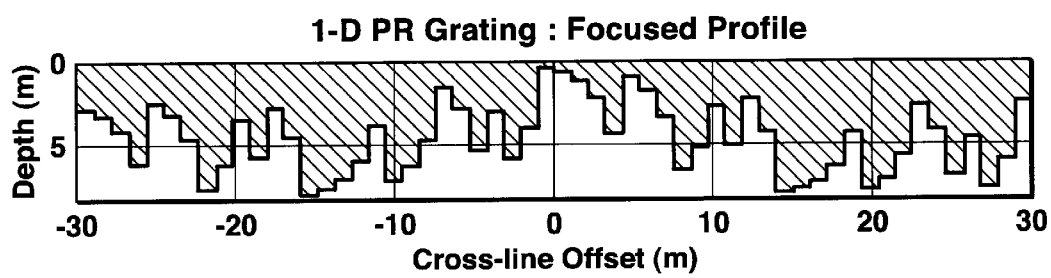

A phase array is computed using two periods of a primitive root sequence for p=31. The profiles of the phase array are obtained and shown in FIGS. 6a and 6b. FIG. 6a shows the profile computed for this primitive root sequence according to Equation (7), while FIG. 6b shows the profile recomputed with the focusing technique of Equation (9).

Figure 7:
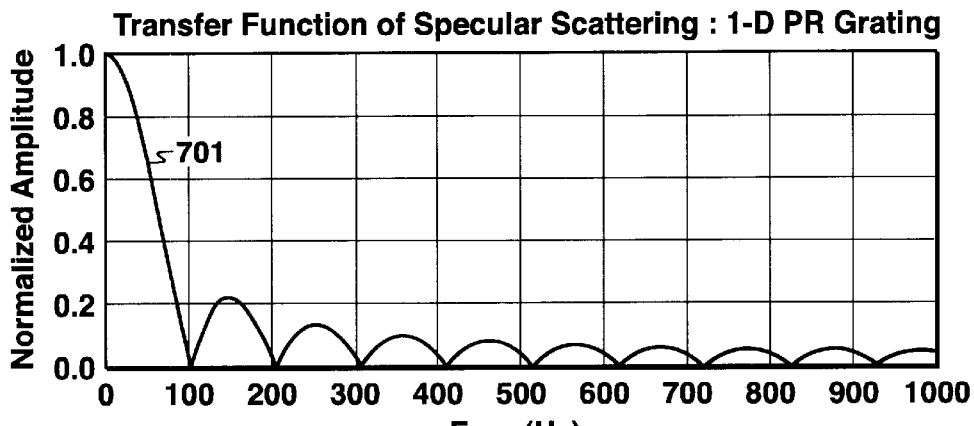
FIG. 7 shows the normalized amplitude of the transfer function of specular scattering for the multiple suppresser.
Figure 8:
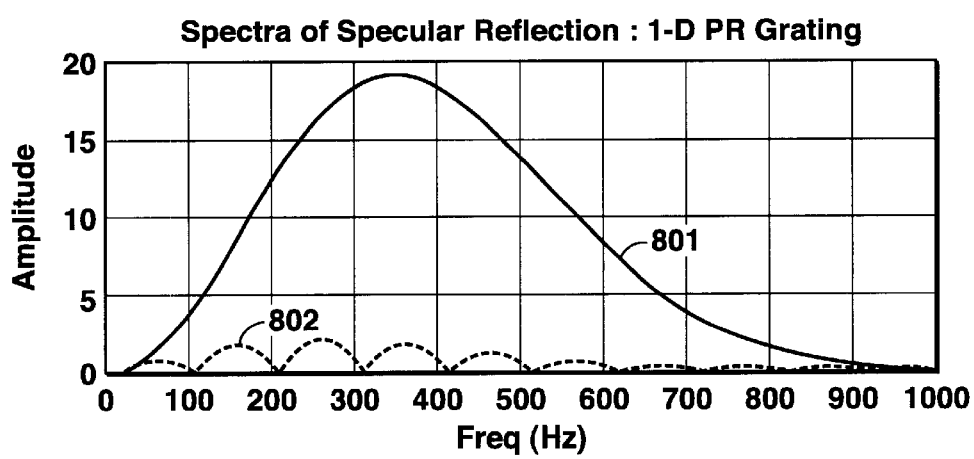
FIG. 8 shows the comparison between the spectra of specular reflection for the input pulse without and with, respectively, the multiple suppresser.
Figure 9:
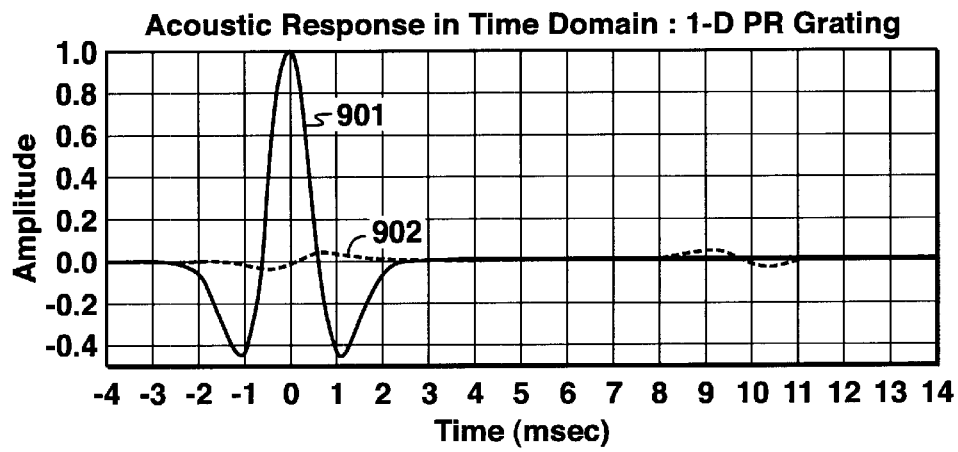
FIG. 9 shows the acoustic responses in the time domain of the multiple without and with, respectively, the multiple suppresser.

FIGS. 7, 8, and 9 show the theoretical performance of this phase array when it is subjected to a plane wave Ricker pulse. FIG. 7 shows the theoretical normalized amplitude 701 of the transfer function of specular scattering. In FIG. 7, the amplitude of the array transfer function becomes less than 0.2 above the lower design frequency (i.e. 200 Hz) and decays as the frequency increases. It means that this phase array can effectively suppress the multiple by more than a factor of 5 above the lower design frequency. FIG. 8 shows the comparison between the theoretical spectra of specular reflection for the input pulse without the suppresser 801 and the spectra of the input pulse with the suppresser 802. The multiple suppresser clearly reduces the multiple energy throughout the design band. FIG. 9 shows the theoretical acoustic response in the time domain of the multiple without the suppressor 901 and the response with the multiple suppresser 902. The peak suppression ratio is about 24.3 (=28 dB) and the root mean square suppression ratio is about 12.8 (=22 dB).

Although the example shown above is designed for high-resolution wavelengths, it carries over to standard seismic wavelengths (10–100 Hz frequency band), with a change in scale. Seismic-scale streamer lengths are 3–5 km. For a 100 m water bottom, and a 150 m wavelength, good multiple suppression is obtained for a diffuser 350 m wide around each streamer (or 175 m outboard of the furthest cable in a multi-streamer experiment). For a triple-streamer experiment with 100 m streamer separation in the cross-line direction, this implies a total diffuser width of 550 m. Diffuser maximum depth is half of the longest wavelength, which for 10–100 Hz seismic data would be 75 m. Most of the elements in the diffuser, however, would be shorter than this depth. For a 500 m water bottom, diffuser maximum depth does not change but its width grows to 700 m for the above triple-streamer embodiment.

Figure 10:
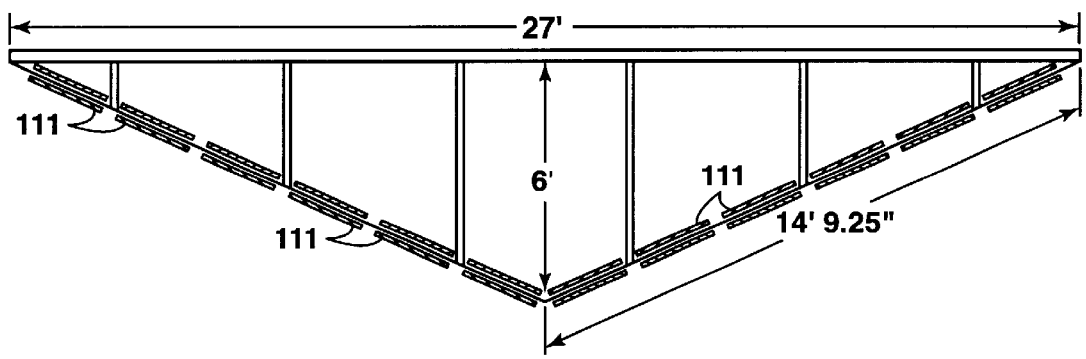
FIG. 10 shows a wedge shaped embodiment of the multiple suppresser used in the small-scale field experiment example.

Small-scale field experiments were performed to measure the actual performance of the above embodiment of the present invention. The experimental site is a 60 m square-shaped freshwater pond and the maximum depth of the pond is 7 m. A watergun was used as a seismic source and 4 channels of hydrophone data were recorded. The air-generation mechanism used between 24 and 32 micro-bubble ceramic stones made by Point Four Systems, Inc., Canada (Model No. MBD-600). This particular ceramic stone can generate air bubbles as small as 100 microns in diameter. Two embodiments of the multiple suppresser of the present invention were deployed. The first configuration, shown in FIG. 10, is a simple wedge (V) shaped diffuser. The second configuration, shown in FIG. 11 is a primitive-root diffuser based on prime number p=17 with finite depth focusing using the methods of Equation (9). The experimental setting miniaturized a common marine seismic data acquisition approach with a seismic vessel, towed streamers (linear hydrophone array), and an air-gun array (seismic source). The entire system (multiple suppresser, watergun, 4-channel streamer, and global positioning system) was assembled into one piece and towed by an electric winch. Each micro-bubble diffuser was fed with compressed air.

Figure 12A:
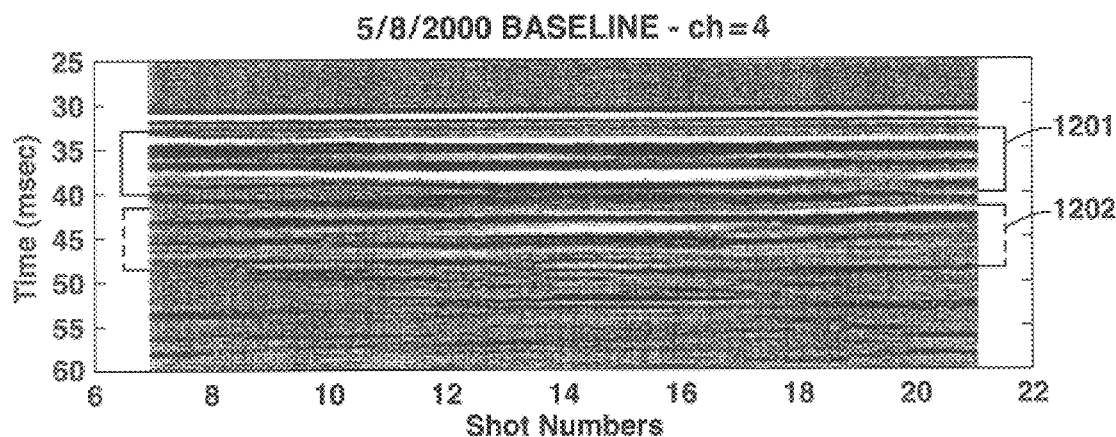
FIGS. 12a and 12b show seismic images taken without and with, respectively, the wedge shaped multiple suppresser of FIG. 10.
Figure 12B:
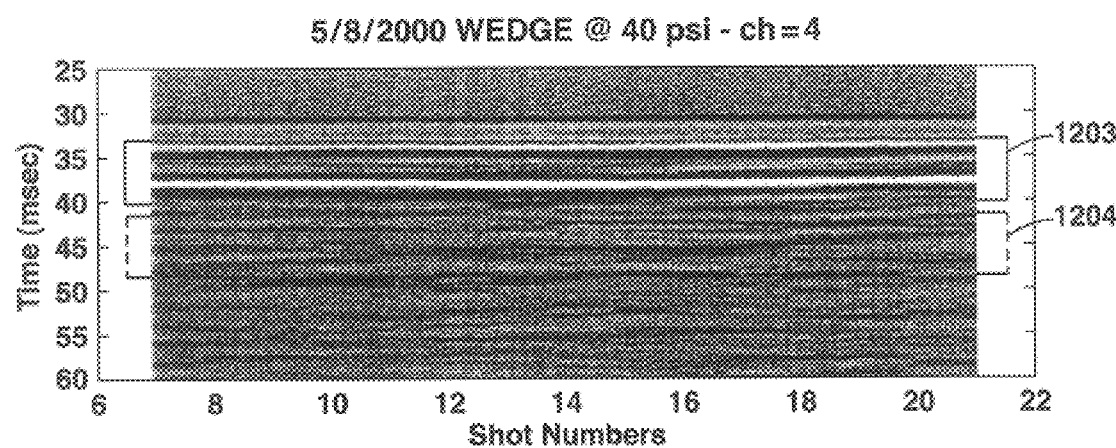

Seismic data were collected and processed with this configuration. Seismic images were obtained both without and with the multiple suppresser operating, that is, generating the micro-bubbles. FIG. 12a is the baseline seismic image taken with the wedge shaped multiple suppresser of FIG. 10 and no multiple suppression. In the figure, the solid rectangular window 1201 indicates primary reflection of seismic waves from the water bottom and the dashed rectangular window 1202 corresponds to the multiple energy generated by the primary reflection and the air-water interface. Those two seismic signals are highly correlated and thus the image is massively contaminated by multiple energy. FIG. 12b is another seismic image taken with the wedge shaped multiple suppresser and 40 psi compressed air supply to the micro-bubble generators. Here, there is multiple suppression by the method of the present invention. Compared to FIG. 12a, the primary seismic signal in the solid rectangular window 1203 remains unchanged, but the multiple in the dashed rectangular window 1204 energy is visibly reduced. Even after the multiple time window, this image contains less reverberant energy, which is a high order multiple (multiple generated by a multiple).

Figure 13A:
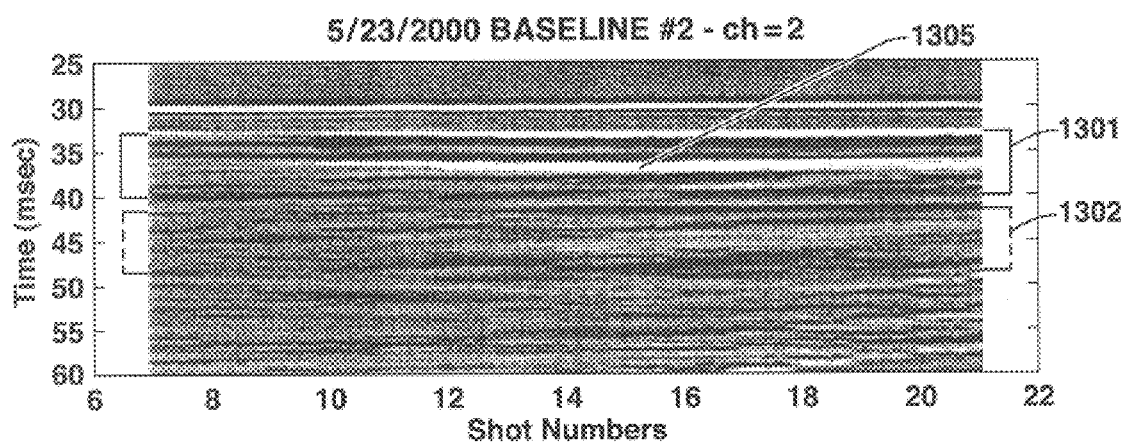
FIGS. 13a and 13b show seismic images taken without and with, respectively, the primitive root multiple suppresser of FIG. 11.
Figure 13B:
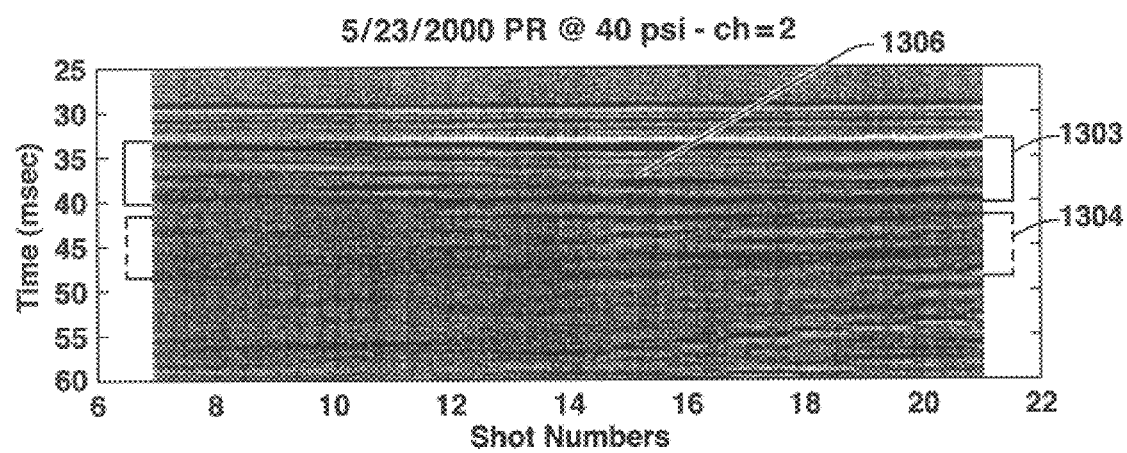

FIG. 13a shows the baseline seismic image taken with the primitive root multiple suppresser of FIG. 11 and no multiple suppression. As in FIG. 12a, the primary reflection exists in the solid rectangular window 1301 and the multiple energy exists in the dashed rectangular window 1302. FIG. 13b is another seismic image taken with the primitive roots multiple suppresser and 40 psi compressed air supply to the micro-bubble generators. Here, there is multiple suppression by the method of the present invention. The multiple energy in the dashed rectangular window 1304 is greatly suppressed compared to the baseline image in FIG. 13a. Even the primary reflection in the solid rectangular window 1303 is changed. While the baseline images in FIG. 13a contains the receiver-side ghost 1305 (i.e. time-delay caused by the distance between the receiver and the air-water interface), the multiple suppresser interferes with the receiver-side ghost 1306 in FIG. 13b. It is additionally beneficial for interpretation of marine seismic data not to have the receiver-side ghost in the data.

The small-scale field experiments verify that the method of the present invention is effective in removing multiple energy in marine seismic data acquisition. In order to implement the present invention in full-scale seismic acquisition, fast, easy, and reliable methods of deployment and recovery of the bubble diffuser are required and provided by the present invention. Since the width of the multiple suppresser for full seismic scale may be on the order of a kilometer, flexible devices made of tension cable and air-diffusing hoses are preferred over solid/rigid devices. As discussed above, FIGS. 2a through 2d show two example deployment concepts of the wedge-shaped and primitive root multiple suppressers for full-scale seismic acquisition. In addition to the main seismic vessel, two auxiliary work vessels assist to deploy, tow, and recover the multiple suppressers. Since the devices are made of flexible cables, hoses, and net, they can be stored on drums and easily deployed and recovered by the work vessels. Alternative configurations in addition to the embodiments discussed here are also possible. For example, the multiple suppresser may be towed in front of the seismic vessel, rather than between the seismic source and streamer.

The present invention includes any other methods that deploy and recover the multiple suppressers, such as using neutrally buoyant and streamlined hydrofoils with encased ceramic air diffusers. The present invention also includes any other cable configurations that allow bubble-making devices to be attached to the cable and deployed.

It should be understood that the invention is not to be unduly limited to the foregoing which has been set forth for illustrative purposes. Various modifications and alternatives will be apparent to those skilled in the art without departing from the true scope of the invention, as defined in the

What is claimed is:

1. An apparatus for suppressing multiples in the collection of seismic data in a body of water with an air-water interface, comprising:
   at least one source positioned in the body of water;
   at least one receiver positioned in the body of water below the air-water interface;
   a bubble diffuser positioned in the body of water so that the bubbles emitted by the bubble diffuser are positioned between the receivers and the air-water interface, said bubble diffuser being configured to create bubble layers that combine high acoustic reflection with depth variation, said depth variation being designed to reflect incident acoustic waves away from the receivers, and said high acoustic reflection meaning that the bubble layer is substantially more reflective than refractive; and
   a control for activating the bubble diffuser during the collection of seismic data by the sources and receivers.

2. The apparatus of claim 1, further comprising:
   a support positioned in the body of water below the air-water interface and attached to the bubble diffuser; and
   a towing line attached to the support for the bubble diffuser for positioning the emitted bubbles between the receivers and the air-water interface.

3. The apparatus of claim 1, further comprising:
   a compressed air hose for supplying compressed air to the bubble diffuser sufficient to emit bubbles providing high acoustic reflection.

4. The apparatus of claim 1, wherein the bubble diffuser comprises a plurality of diffuser elements.

5. The apparatus of claim 4, wherein the diffuser elements are ceramic stone air diffusers.

6. The apparatus of claim 4, wherein each diffuser element comprises at least one porous hose air diffuser.

7. The apparatus of claim 4, wherein the plurality of diffuser elements are positioned in a vertical orientation to increase bubble emission.

8. The apparatus of claim 4, wherein the plurality of diffuser elements are positioned in a horizontal orientation to increase bubble emission.

9. The apparatus of claim 8, wherein the plurality of diffuser elements comprise trailing porous air hoses.

10. The apparatus of claim 4, wherein the diffuser elements are positioned in a vertically oriented phase grating.

11. The apparatus of claim 10, wherein the phase grating is focussed on a range of distances to the sources and receivers.

12. The apparatus of claim 10, wherein the diffuser elements of the phase grating are positioned according to a discrete number sequence.

13. The apparatus of claim 12 wherein the discrete number sequence is a primitive root sequence.

14. The apparatus of claim 10, wherein the diffuser elements of the phase grating are positioned in a generally concave upward shape.

15. The apparatus of claim 14, wherein the diffuser elements of the phase grating are positioned substantially in a wedge shape.

16. A method for suppressing multiples during the collection of seismic data in a body of water with an air-water interface, comprising the steps of:

positioning at least one source and at least one receiver in the body of water, wherein the receivers are positioned below the air-water interface; and emitting bubbles between the receivers and the air-water interface forming a bubble layer with a lower boundary surface having depth variation, said depth variation being designed to reflect incident acoustic waves away from the receivers, and said bubble layer having a concentration of bubbles sufficient to make the bubble layer substantially more reflective than refractive.

17. The method of claim 16, wherein the emitted bubbles are of sufficiently small size so that the bubbles rise slowly in the body of water.

18. The method of claim 16, wherein said depth variation is according to a discrete number sequence.

19. The method of claim 18 wherein the discrete number sequence is a primitive root sequence.

20. The method of claim 16, wherein the lower boundary surface of the bubble layer is shaped generally concave upward in a cross-section perpendicular to the direction of seismic data collection.

21. The method of claim 20, wherein the concave upward shape is substantially a wedge shape.

* * * * *